Figure 1:
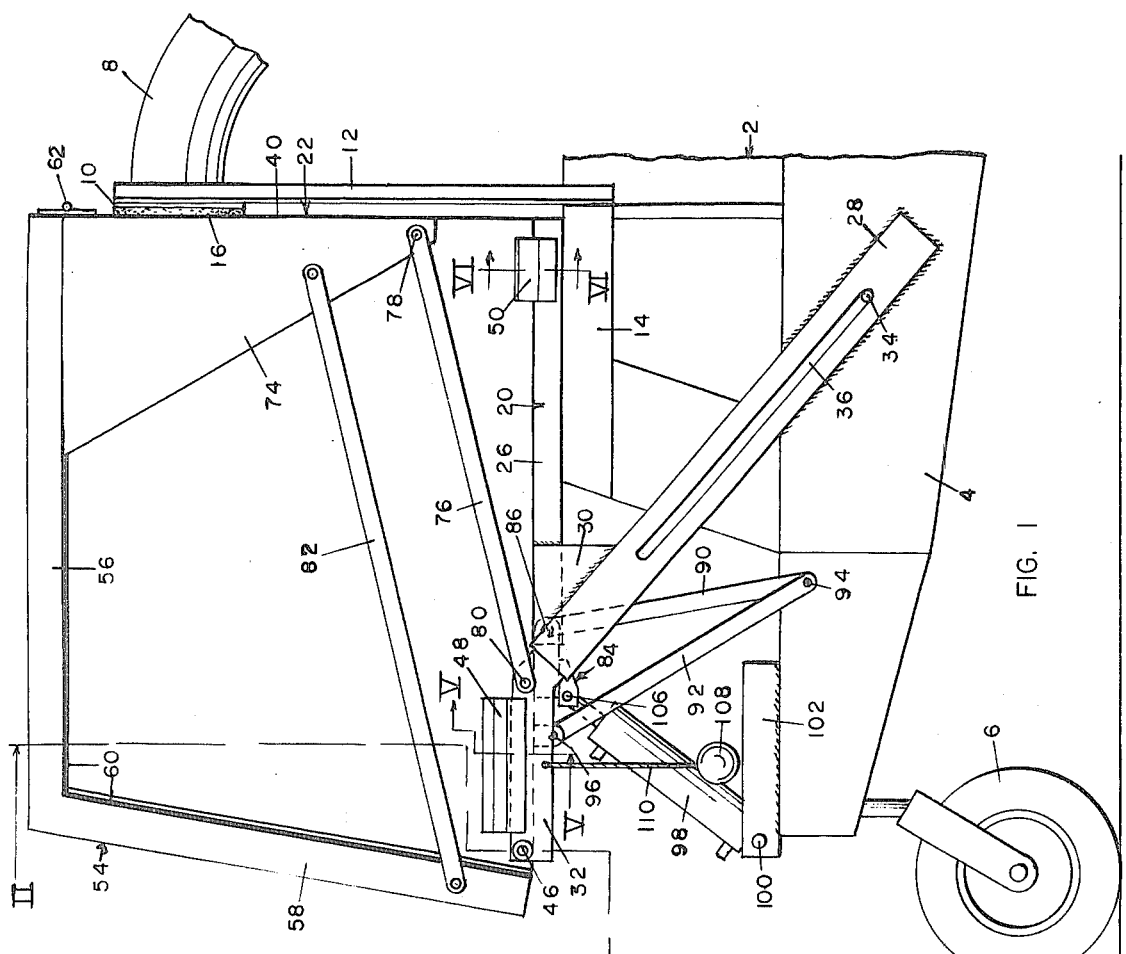

United States Patent [19]

Mullet et al.

[11] Patent Number: 4,487,007
[45] Date of Patent: Dec. 11, 1984

[54] STORAGE BOX FOR MOWER CLIPPINGS

[75] Inventors: David L. Mullet, Hesston; Raymond J. Rilling, Moundridge; Elmer D. Voth, Newton, all of Kans.

[73] Assignee: Excel Industries, Inc., Hesston, Kans.

[21] Appl. No.: 507,926

[22] Filed: Jun. 27, 1983

[51] Int. Cl.³ .............................................. A01D 35/22
[52] U.S. Cl. ....................................... 56/16.6; 56/202; 298/11; 298/23 R; 298/23 D; 414/471; 414/486
[58] Field of Search .................... 56/16.6, 202, 364; 298/11, 18, 23 D, 23 R; 414/471, 486, 488, 501

[56] References Cited

U.S. PATENT DOCUMENTS

| 2,964,896 | 12/1960 | Finocchiaro | 56/364 |
| 3,228,727 | 1/1966 | Paulson | 298/11 |
| 3,736,736 | 6/1973 | Myers | 56/202 |
| 4,019,780 | 4/1977 | Bishop | 298/11 |
| 4,113,120 | 9/1978 | Pickrell | 414/501 |
| 4,156,337 | 5/1979 | Knudson | 56/16.6 |
| 4,310,998 | 1/1982 | Cuba | 56/16.6 |
| 4,327,945 | 5/1982 | Fowler | 298/11 |
| 4,334,820 | 6/1982 | Homura | 298/11 |

Primary Examiner—Gene Mancene
Assistant Examiner—David I. Tarnoff
Attorney, Agent, or Firm—John A. Hamilton

[57] ABSTRACT

A storage box for the clippings of a lawnmower consisting of a normally covered box adapted to be mounted on the mower vehicle and to receive grass cuttings and the like of the mower until it is full, and a power mechanism operable when actuated to first raise the box until its pouring lip is higher than the receiving box of a disposal vehicle, such as the bed of a pick-up truck, and transport it horizontally until its pouring lip is over the truck bed, and then to uncover the box and tilt it to pour its contents over its lip into the truck bed.

6 Claims, 6 Drawing Figures

STORAGE BOX FOR MOWER CLIPPINGS

This invention relates to new and useful improvements in storage boxes for lawnmower clippings.

Various types of storage boxes or other containers of a general type operable to receive and store the mower clippings until they become filled, are of course common, the clippings usually being delivered to such a box through a conduit by a suitable blower arrangement. Most operate adequately up till this time, but difficulties and inconveniences often arise in the dumping and disposal of their contents. Commonly they must be manually detached from the mower, dumped and reattached. This is inconvenient and time-consuming, and the necessity of manual handling reduces the capacities which can be used, due to the weight of larger sizes when full. Some permit power dumping without detachment from the mower vehicle, but usually only directly at ground level. This requires either that the mower travel to an established dumping site before its contents can be discharged, which is time-consuming and represents lost mowing time if the dumping site is distant, or an extra handling of the cuttings if they are dumped on the ground at the mowing site, since they must then be recollected and transported to the dumping site by other means.

Accordingly, a primary object of the present invention is the provision of a storage box for mower cuttings which, while mounted on a mower vehicle normally at a lower elevation, may be raised by a power mechanism to an elevation such that its pouring lip is higher than the receiving bed of a disposal vehicle, such as the bed of a pick-up truck, so that when tilted to dump its contents, said contents are dumped directly into the truck bed. A pick-up truck is mentioned merely by way of example. Other types of disposal vehicles could also be utilized.

Another object is the provision of a storage box of the character described having means whereby the box, as it is elevated as described above, is also moved horizontally to project horizontally outwardly from the mower vehicle, in order that its pouring lip may be disposed directly above the truck bed, so that its contents may be dumped into the truck bed without spillage, and without interference between the truck and the mower vehicle.

A further object is the provision of a storage box of the character described wherein the box is provided with a cover operable when closed to permit the escape of air but not of clippings, and with the addition of means operable to open said cover only when said box is tilted to dump its contents.

A still further object is the provision of a storage box of the character described wherein all of the functions described above, namely the elevation of the box, its horizontal movement, tilting thereof to dump its contents, and the opening of said cover, all in the proper sequential order, are accomplished by a single power device, such as a single hydraulic cylinder.

Other objects are simplicity and economy of construction, and efficiency and dependability of operation.

Figure 2:
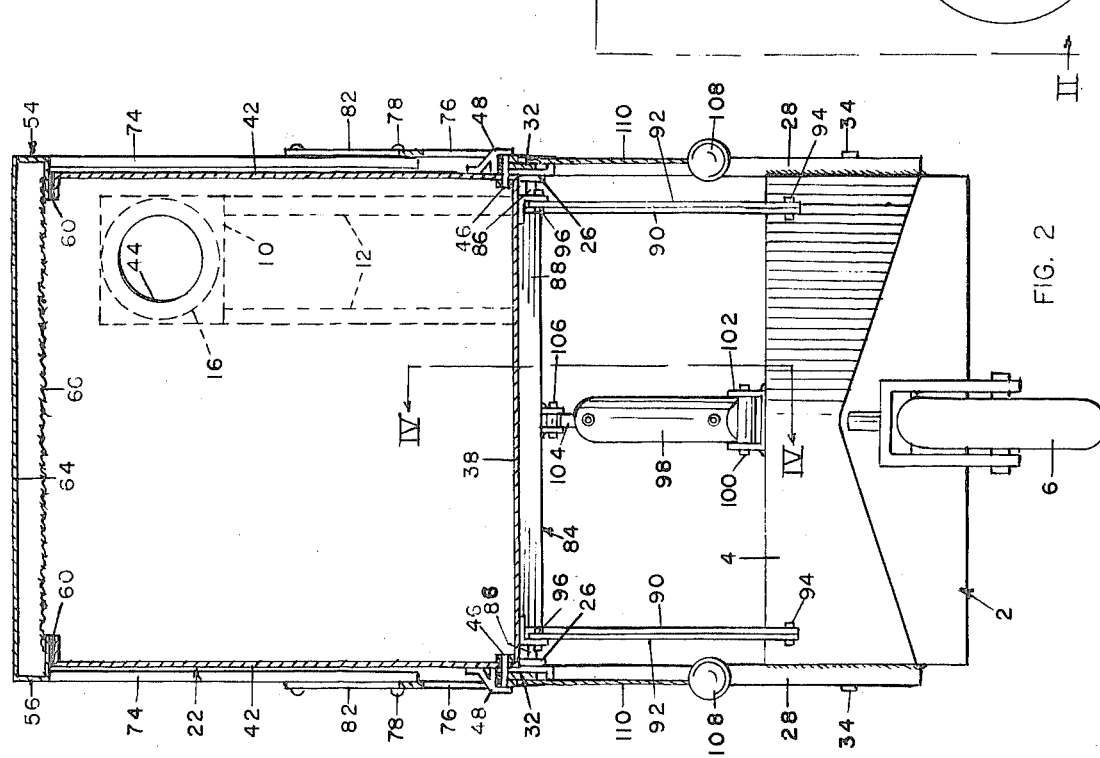
Figures 3, 4, 5, 6:
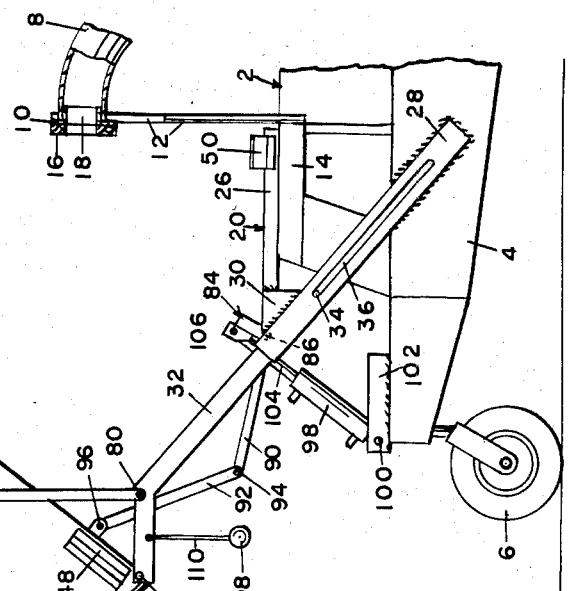

With these objects in view, as well as other objects which will appear in the course of the specification, reference will be had to the accompanying drawing, wherein:

FIG. 1 is a fragmentary side elevational view of a small tractor, showing a storage box for mower clippings mounted operably thereon, the box being shown lowered to its normal riding position, FIG. 2 is a sectional view taken on line II—II of FIG. 1, FIG. 3 is a reduced view similar to FIG. 1, but showing the box moved to its dumping position, FIG. 4 is an enlarged fragmentary sectional view taken on line IV—IV of FIG. 2, but showing the parts in the position assumed when the box is raised to its dumping position, FIG. 5 is an enlarged, fragmentary sectional view taken on line V—V of FIG. 1, and FIG. 6 is an enlarged, fragmentary sectional view taken on line VI—VI of FIG. 1.

Like reference numerals apply to similar parts throughout the several views, and the numeral 2 applies generally to a small tractor, which in the present example has been selected for illustration as the mower vehicle. It includes a generally horizontal frame 4 supported at its rearward end by a castered ground-engaging tiller wheel 6, and at its forward end by a pair of ground-engaging drive wheels, not shown. It will be understood that a mower deck of any suitable type, not shown, driven by the tractor and capable of mowing grass and the like and, by a blower action, to deliver clippings through a flexible, hose-like conduit 8 toward the rear of the tractor, is mounted at the forward end of the tractor. The rearward end of this conduit communicates with a hole 18 formed in a vertical, transverse plate 10 supported at the upper ends of a pair of posts 12 fixed at their lower ends to any suitable rigid portion of the tractor, in this case the hood 14 of the tractor engine. The rearward face of plate 10 has a thick ring 16 of sponge rubber applied thereto surrounding the hole 18 of said plate. The function of this ring will be set forth hereinafter.

A base 20 for the storage box, which is indicated generally at 22, is disposed horizontally above tractor frame 4, just rearwardly of posts 12 but forwardly of the extreme rearward end of frame 4. It is rigidly affixed to tractor engine hood 14, or any other suitable rigid portion of the tractor, and includes a horizontal transverse bar 24 overlying said hood just rearwardly of posts 12 (see FIG. 6), and a pair of parallel side bars 26 extending rearwardly from the ends of bar 24, respectively at opposite sides of box 22. A pair of tubular slides 28 are welded or otherwise affixed to tractor frame 4 at their lower ends, respectively at opposite sides thereof, and are inclined upwardly and rearwardly, each being rigidly affixed at its upper end to the rearward end of the base bar 26 at that side of the tractor, the connection being reinforced by a welded gusset plate 30. Said slides are parallel with each other, and each carries a slide bar 32 therein for longitudinal sliding movement. Each slide bar may be moved from a lowered position, as shown in FIG. 1, in which it is encased principally in slide tube 28, to a raised position extending upwardly and rearwardly therefrom. Its movement is limited by a stud 34 affixed thereto and projecting outwardly through a longitudinal slot 36 formed in the slide tube. A portion of the slide bar projects upwardly from the slide tube even when the former is completely lowered, and is angled to extend horizontally rearwardly, its upper edge being disposed just above the level of box base 20, but rearwardly therefrom.

Storage box 22 is generally rectilinear, having a floor 38, a front wall 40, and side walls 42, being open at its top and rear sides. When it is in its lowered position, as shown in FIG. 1, it rests on box base 20, with its front wall 40 disposed in compressing relation to rubber ring 16. Said front wall has an aperture 44 formed therein which is then concentrically coincident with said ring, which thus provides an entry for clippings into the box, sealed by the ring against the escape of clippings and dust. The box then extends substantially rearwardly from base bars 26, to a point generally coextensive with the rearward ends of the horizontal portions of slide bars 32. It rests between these portions of the slide bars, and the extreme rearward edge portion of each box side wall 42 is pivoted to the adjacent slide bar, at its rearward end of the latter, by a pivot pin 46. Said pivot pins extend horizontally and transversely of the box, and are coaxial. Just forwardly of pivot 46, a downwardly opening U-shaped support member 48 is rigidly fixed to the exterior surface of each box side wall 42, so as to engage and be supported by the upper edge of the horizontal portion of the adjacent slide bar 32 whenever the box is disposed horizontally, as best shown in FIG. 5. Also, a guide member 50 is fixed to each side of box base 20, adjacent the forward end of the box, and is inclined upwardly and outwardly therefrom as best shown in FIG. 6. These guides have the function of directing the box laterally to rest accurately on base 20 as the box is lowered to said base. An additional box support member 52 may also be fixed to the inner side of base bar 26 at that point, so as to project beneath the box to provide added support therefor.

Box 22 is provided with a cover indicated generally at 54, and including a top panel 56 adapted to close the top of the box, and a rear panel 58 adapted to close the rear opening of the box. Sealing strips 60 provide an air seal between the cover and the box when the cover is closed. Top panel 56 is hinged to the top edge of front box wall 40 on a horizontal transverse axis, as indicated at 62, and both panels are hollow to form air space therein, these spaces being joined at the connection of the panels. Top panel 56 has an outer sheet metal wall 64 (see FIG. 3) and an inner wall 66 formed entirely of wire screen or the like. Rear panel 58 has inner and outer walls 68 and 70 both formed of sheet metal, but the space therebetween is open at the lower edge of the panel, as indicated at 72 in FIG. 3. A pair of arms 74 are fixed to the respectively opposite lateral edges of top cover panel 56, adjacent the front of the box, and depend therefrom adjacent the exterior sides of the respective side walls 42 of the box. A link 76 is pivoted to the lower end of each arm 74, as at 78, and extends forwardly and downwardly, being pivoted at its opposite end, as at 80, to the corresponding slide bar 32, substantially at the rearward end of the horizontal portion of said slide bar. Links 76 are of such length that when the box is disposed horizontally, cover 54 is closed. Also, at each side of the box, a rigid strut 82 interconnects each arm 74 to rear cover panel 58, whereby to preserve the structural rigidity of the cover.

Storage box 22 is operably moved by means including a short crank 84 extending horizontally and transversely between the rearward ends of box base bars 26, and pivoted, as at 86, in said base bars. For rigidity, said crank includes a box beam 88 extending nearly the full distance between pivots 86, but disposed eccentrically thereto. Affixed to each end of beam 88 is a radially extending crank 90. Cranks 90 are angularly coincident, and form a rigid bell crank lever in combination with crank 84. When box 22 is lowered to rest on base 20, crank 84 extends horizontally rearwardly beneath the floor 38 of the box, so as not to interfere therewith, and cranks 90 project downwardly, as shown in FIG. 1. The lower end of each crank 90 is pivoted to one end of a link 92, as at 94, and link 92 extends upwardly, being pivoted at its opposite end, as at 96, to the floor 38 of the box, in forwardly spaced relation from the box pivots 46. A single hydraulic cylinder 98, which it will be understood is powered and controlled by the standard hydraulic system of tractor 2, is pivoted at its lower end, as at 100, in a bracket 102 fixed to tractor frame 4, well below the rearward end of box 22. Said cylinder extends forwardly and upwardly, and its piston rod 104 is pivoted at its upper end to an intermediate point of crank 84, as at 106. For a purpose to be described, an object such as a rubber ball 108 is suspended from the horizontal portion of each slide bar 32 by means of a short string 110.

In operation, it will be seen that when the box 22 is in its normal riding position, disposed horizontally and lowered to rest on its base 20, its cover 54 will be closed and its front wall aperture 44 interconnected with clippings conduit 8, so that the box may receive clippings blown through said conduit by the mower deck at the front of the tractor frame, as described. The clippings themselves tend to fall by gravity to the bottom of the box to commence filling thereof, while the entraining air, but not clippings, escape through the screen 66 forming the inner wall of top cover panel 56, and passes downwardly through rear panel 58, escaping at 72. Rubber ring 16, as well as sealing strips 60, effectively prevent the escape of clippings to atmosphere, and the discharge of air at the lower edge of rear cover panel 58 tends to minimize pollution of the surrounding air by air-blown dust and the like.

When the box becomes full and disposal of its contents is required, the present structure permits dumping of the clippings over the pouring lip of the box, which is of course the rearward edge of box floor 38, directly into a suitable container, which could for example constitute the bed of an ordinary pick-up truck or similar vehicle, even though the walls of the truck bed normally rise higher above the ground than the normal elevation of the box floor. To do so, the tractor operator, by actuating controls accessible to him while in the driver's seat (not shown) of the tractor, extends the piston rod 104 of cylinder 98 upwardly. This pivots crank 84 upwardly and forwardly, and cranks 90 rearwardly and upwardly, so that links 92 exert an upward force on the box floor to lift said box. At this time said lifting force merely moves slide bars 32 upwardly in slides 28. It does not tilt the box on its pivots 46, even though links 92 are exerting a force tending to cause said tilting, since the moment arm of the center of gravity of the box, relative to its pivots 46, is greater than the moment arm of links 92 relative to pivots 46, even when the box is empty. Therefore, links 92 initially cause only the extension of slide bars 32, while box 22 remains horizontal, with its weight carried by the engagement of its support members 48 with slide bars 32, and with its cover 54 completely closed, during the entire rising motion of the box. When studs 34 of the slide bars engage in the upper ends of slots 36 of slides 28, the extension of the slide bars is arrested, so that the continued upward pressure exerted on the box by links 92 will pivot the box upwardly and rearwardly as shown in FIG. 3. Simultaneously, links 76 will pivot cover 54 to its open position, also as shown in FIG. 3, so that the contents of the box are dumped into the truck bed. The inclination of slides 28 provides both that the box is elevated to a position with its pouring lip disposed higher than the elevation of the walls of the truck bed, although it may normally be disposed at a substantially lower level, and also that the box is transported horizontally during its elevation to dispose its pouring lip directly above the truck bed without interference between the truck and the tractor. Cover 54, when open, uncovers both the top and rearward sides of the box. This relieves pressure on the clippings, which may be tightly packed in the box, and thus promotes easier, more efficient dumping of the clippings. Thus, it will be seen that all four movements of the box and its cover, namely the elevation, horizontal transport, and tilting of the box, and the opening of the cover, are accomplished in a proper sequence by a single power device, namely hydraulic cylinder 98. This provides a valuable degree of economy. Also, since no manual operations are required, the box may be of a very large capacity, requiring less frequent dumping. As shown, the box is designed to have a capacity of about twenty bushels, although its size is of course optional.

It is in connection with the dumping operation that rubber balls 108 become useful. The operator may elevate the box, but not immediately tilt it, while still at some distance from the pick-up truck or other receiving vehicle, in order to avoid any possible interference between the truck and the box during the elevation. He then may back the tractor while observing the balls 108, which he may easily see from the driver's seat, until the balls are closely adjacent, but not deflected by, the side walls of the truck bed. He may thus avoid backing any tractor part into the truck, which might of course be damaging to either or both, and still be assured that the pouring lip of the box is disposed directly above the truck bed, for dumping the box contents into the truck bed without spillage.

Reversing the action of the cylinder, by exhausting fluid from its lower end, of course reverses the described dumping process. The box first pivots downwardly and rearwardly to a horizontal position, until its support members 48 rest on the horizontal portions of slide bars 32, with cover 54 being simultaneously closed by links 76, and the slide bars 32 then move downwardly in slides 28 until the box rests on its base 20, its forward end being guided accurately into a proper lateral position by guide members 50. The center of gravity of the box is disposed well forwardly of the rearward end of base 20, so that so long as the box is on the base, it requires no support from the cylinder. Thus the tractor and box may be stored for any length of time with the tractor engine and hydraulic system inactive.

The connection of the box to clippings conduit 8 is of course severed, as shown in FIG. 3, whenever the box is elevated, but automatically re-established whenever the box is lowered. It would of course be possible to connect the conduit directly to the box, but this would require a conduit of such length, to accommodate the raising and tilting of the box, that it would be excessively slack and unmanageably cumbersome when the box is lowered.

While we have shown and described a specific embodiment of our invention, it will be readily apparent that many minor changes of structure and operation could be made without departing from the spirit of the invention.

What we claim as new and desire to protect by Letters Patent is:

1. In combination with a lawnmower vehicle comprising a mowing machine and means operable to deliver clippings cut by said mowing machine through a suitable conduit:
   a. a box for receiving said clippings carried by said vehicle for elevation from a horizontal base position relative to said vehicle, and for tilting movement on a horizontal axis to dump its contents,
   b. means interconnecting said conduit to said box whereby to deliver said clippings thereto, and
   c. operating means operable when actuated first to elevate said box relative to said vehicle, whereby to permit the contents of said box to be dumped into a higher disposal vehicle, and then to tilt said box on its horizontal axis, whereby to dump its contents into said disposal vehicle, said operating means comprising upwardly extensible slide members carried by said mower vehicle, said box being pivoted on a horizontal axis to the upper ends of said slides, means limiting the upward movement of said slides, support members carried by said box and normally engaging said slides to support said box in a horizontal position, a crank carried pivotally by said mower vehicle and operable when turned in one direction to apply upward pressure to said box in spaced relation from its pivotal connection to said slides, but with a lesser moment arm relative to the box pivots than the box itself has to its pivots, whereby initial movement of said crank functions to elevate said box by extending said slides, but without tilting said box, until said slides reach the upper limit of their movement, and only then functions to pivot said box to dump its contents, and power means operable to turn said crank.

2. The combination as recited in claim 1 wherein said slides are inclined upwardly and also horizontally toward the side of the box toward which said box is tilted to dump its contents, whereby said box is transported horizontally as it is elevated, to project horizontally outwardly from the mower vehicle.

3. The combination as recited in claim 2 wherein said clippings conduit terminates at a position spatially fixed relative to the mower vehicle, in which it coincides with an aperture in the upper portion of the box at the side thereof opposite to that toward which the box tilts to dump its contents, whereby the box is moved horizontally away from the conduit terminus as the box is elevated.

4. The combination as recited in claim 1 with the addition of a box cover hinged to said box and operable when closed to seal said box against the escape of clippings, said cover being closed whenever the box is disposed horizontally, and wherein said operating means additionally includes a linkage interconnecting said cover to said slides, and operable to open said cover as said box is tilted relative to said slides.

5. The combination as recited in claim 4 wherein said box is open both at the top and at the side thereof toward which it is tilted to dump its contents, and wherein said cover closes both the top and the open side of the box, whereby when opened it relieves pressure on the possibly packed contents of the box to facilitate dumping thereof.

6. The combination as recited in claim 5 wherein said cover includes a top panel and a side panel at the side of the box toward which said box is tilted to dump its contents, both of said panels being hollow, the top panel having an outer solid wall and an inner screen wall, and the side panel having solid inner and outer walls the space between which is open to the atmosphere at the lower edge of the panel.

* * * * *